(12) United States Patent
Stirling-Gallacher et al.

(10) Patent No.: US 12,212,453 B2
(45) Date of Patent: *Jan. 28, 2025

(54) DEVICES FOR COMMUNICATION IN A WIRELESS COMMUNICATION NETWORK USING BEAMFORMING

(71) Applicant: Huawei Technologies Co., Ltd., Shenzhen (CN)

(72) Inventors: Richard Stirling-Gallacher, Munich (DE); Zhongfeng Li, Shanghai (CN); Jian Luo, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 803 days.

This patent is subject to a terminal disclaimer.

(21) Appl. No.: 17/206,812

(22) Filed: Mar. 19, 2021

(65) Prior Publication Data

US 2021/0212146 A1  Jul. 8, 2021

Related U.S. Application Data

(63) Continuation of application No. PCT/EP2018/075525, filed on Sep. 20, 2018.

(51) Int. Cl.
*H04L 41/0668* (2022.01)
*H04B 7/06* (2006.01)
(Continued)

(52) U.S. Cl.
CPC ....... *H04L 41/0668* (2013.01); *H04B 7/0617* (2013.01); *H04B 7/0695* (2013.01);
(Continued)

(58) Field of Classification Search
CPC ..... H04W 24/04; H04W 24/08; H04W 72/04; H04W 76/19; H04W 4/40; H04W 88/04;
(Continued)

(56) References Cited

U.S. PATENT DOCUMENTS

2015/0282243 A1   10/2015   Lei et al.
2018/0097556 A1   4/2018   Nagaraja et al.
(Continued)

FOREIGN PATENT DOCUMENTS

CN   107005858 A   8/2017
CN   107079459 A   8/2017
(Continued)

OTHER PUBLICATIONS

Huawei et al., "Discussion on BFR for SCell", 3GPP TSG RAN WG1 Meeting #94, R1-1809120, Gothenburg, Sweden, Aug. 20-24, 2018, 6 pages.
(Continued)

*Primary Examiner* — Ji-Hae Yea (74) *Attorney, Agent, or Firm* — Slater Matsil, LLP (57) ABSTRACT

A first communication device is configured to communicate with a second communication device and a third communication device in a wireless communication network using beamforming. The first communication device is configured to determine a new beam from a plurality of available beams of the second communication device in response to a beam failure event. The second communication device transmits a beam failure recovery request (BFRQ) message to the third communication device. The BFRQ message contains information about the new beam determined by the first communication device. The second communication device receives from the second communication device a BFRQ response message.

20 Claims, 6 Drawing Sheets

(51) Int. Cl.

| | | |
|---|---|---|
| *H04B 7/08* | (2006.01) | |
| *H04L 41/0677* | (2022.01) | |
| *H04W 4/40* | (2018.01) | |
| *H04W 24/08* | (2009.01) | |
| *H04W 72/04* | (2023.01) | |
| *H04W 76/19* | (2018.01) | |

(52) U.S. Cl.
CPC ......... *H04B 7/088* (2013.01); *H04L 41/0677* (2013.01); *H04W 24/08* (2013.01); *H04W 72/04* (2013.01); *H04W 76/19* (2018.02); *H04W 4/40* (2018.02)

(58) Field of Classification Search
CPC ... H04W 72/11; H04W 72/115; H04W 72/40; H04L 41/0668; H04L 41/0677; H04B 7/0695; H04B 7/0617; H04B 7/088; H04B 7/063; H04B 7/06952; H04B 7/06954; H04B 7/06956; H04B 7/06958; H04B 7/0696; H04B 7/06962; H04B 7/06964; H04B 7/06966; H04B 7/06968
See application file for complete search history.

(56) References Cited

U.S. PATENT DOCUMENTS

| | | | |
|---|---|---|---|
| 2018/0192384 A1 | 7/2018 | Chou et al. | |
| 2018/0227899 A1 | 8/2018 | Yu et al. | |
| 2018/0242327 A1 | 8/2018 | Frenne et al. | |
| 2018/0367374 A1 | 12/2018 | Liu et al. | |
| 2019/0306842 A1* | 10/2019 | Cirik | H04W 72/21 |
| 2020/0106510 A1* | 4/2020 | Song | H04W 76/27 |
| 2020/0178211 A1* | 6/2020 | Liu | H04W 76/11 |
| 2020/0221429 A1* | 7/2020 | Li | H04L 5/0053 |
| 2021/0058132 A1* | 2/2021 | Xu | H04W 74/0833 |

FOREIGN PATENT DOCUMENTS

| | | | |
|---|---|---|---|
| CN | 107567038 A | 1/2018 | |
| WO | WO-2016127403 A1 * | 8/2016 | ........... H04B 7/0617 |
| WO | 2018064483 A1 | 4/2018 | |
| WO | 2018131934 A1 | 7/2018 | |
| WO | 2018135677 A1 | 7/2018 | |
| WO | 2018136185 A1 | 7/2018 | |
| WO | 2018141303 A1 | 8/2018 | |

OTHER PUBLICATIONS

3GPP TS 38.213 V15.2.0 (Jun. 2018), 3rd Generation Partnership Project; Technical Specification Group Radio Access Network; NR; Physical layer procedures for control (Release 15), 98 pages.
3GPP TS 38.321 V15.2.0 (Jun. 2018), 3rd Generation Partnership Project; Technical Specification Group Radio Access Network; NR; Medium Access Control (MAC) protocol specification (Release 15), 73 pages.
3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.
Huawei, et al., "General views on beam failure recovery", 3GPP TSG RAN WG1 NR Ad Hoc Meeting, R1-1709929, Qingdao, China, Jun. 27-30, 2017, 8 pages.
Chairman, "Draft Agenda", 3GPP TSG RAN WG1 Meeting #89, R1-1706865, Hangzhou, P.R. China, May 15-19, 2017, 13 pages.
Chairman, "Draft Agenda", 3GPP TSG RAN WG1 Meeting #90 , R1-1712030, Prague, Czech Republic, Aug. 21-25, 2017, 15 pages.
Chairman, "Draft Agenda", 3GPP TSG RAN WG1 Meeting 90bis, Prague, CZ, Oct. 9-13, 2017, R1-1716940, 10 pages.
Mediatek Inc., "Summary for Remaing [sic] issues on Beam Failure Recovery" 3GPP TSG RAN WG1 Meeting #91, R1-1721494, Reno, NV, US, Nov. 27-Dec. 1, 2017, 18 pages.
Ericsson, "Multi-cell beam recovery", 3GPP TSG RAN WG1 Meeting AH 1801, R1-1800702, Vancouver, Canada, Jan. 22-26, 2018, 5 pages.

* cited by examiner

DEVICES FOR COMMUNICATION IN A WIRELESS COMMUNICATION NETWORK USING BEAMFORMING

CROSS-REFERENCE TO RELATED APPLICATIONS

This application is a continuation of International Application No. PCT/EP2018/075525, filed on Sep. 20, 2018, the disclosure of which is hereby incorporated by reference in its entirety.

TECHNICAL FIELD

In general, the present invention relates to communication networks. More specifically, the present invention relates to communication devices for communication in a wireless communication network using beamforming.

BACKGROUND

Beam forming is extensively used in the 5G New Radio (5G NR) standard. Beam failure in 5G NR typically occurs when all serving beams (a set of beams assigned which a receiving device, e.g. a UE, can select and use. It may not use all of them at the same time.) from a serving gNB or transmit and receive point (TRP) to a corresponding user equipment (UE) fail, e.g., the packet error rate (PER) of all of these assigned serving beams is too high for a certain period of time. This beam failure may occur because the beams direction of these serving beams is no longer the best direction due to movement of the UE or due to the fact that an object blocks the current beam-formed link between the TRP and the UE.

Figure 1:
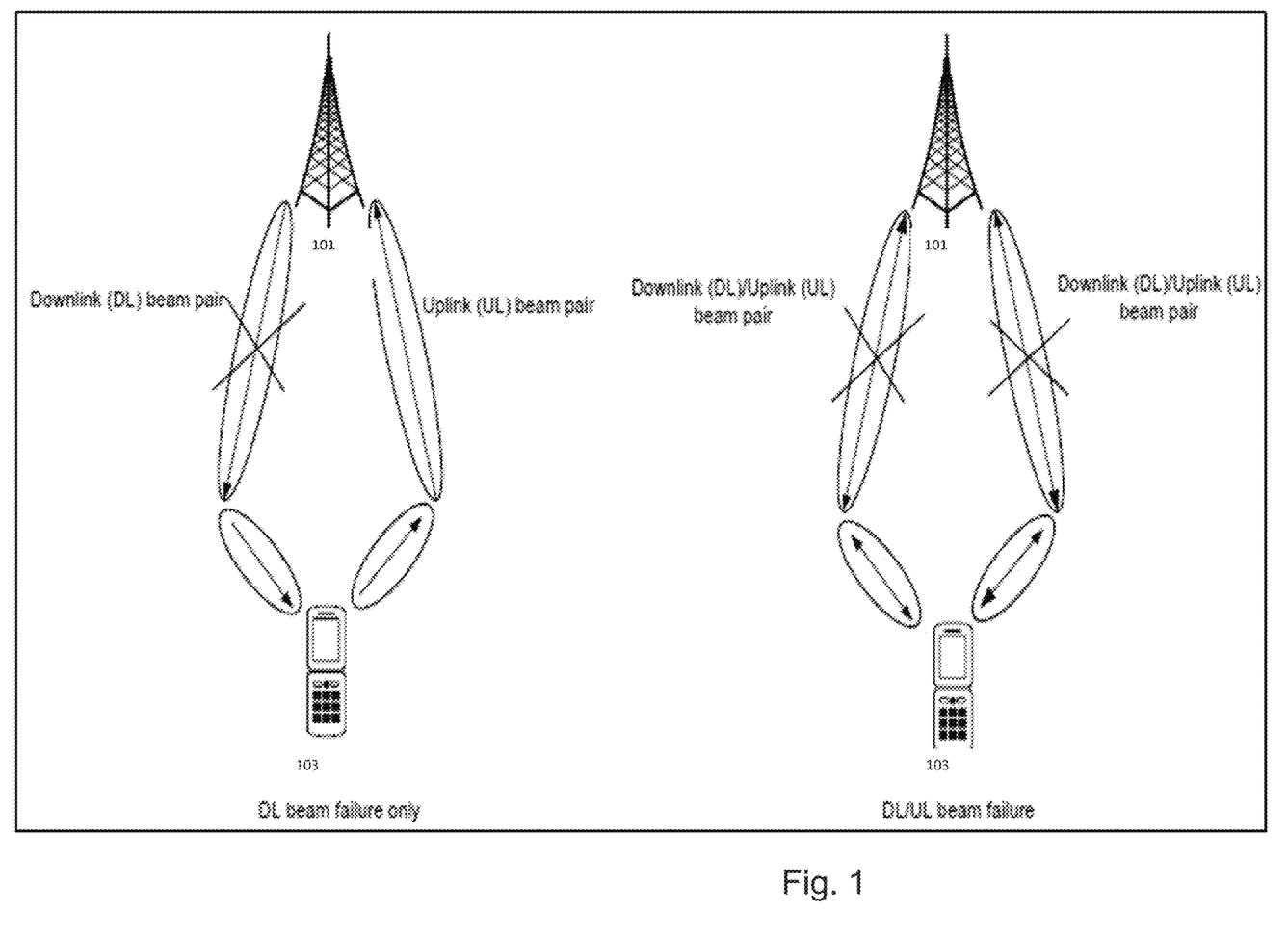
FIG. 1 shows a schematic diagram illustrating two cases of beam failure.

The beam failure may occur just in the downlink direction as shown on the left hand side of FIG. 1 while uplink beam directions are still available, or the beam failure may also occur in the uplink beam direction(s) as shown in the right hand side of FIG. 1.

Beam Failure Recovery (BFR) is an agreed 5G NR procedure (initiated by the UE transmitting a beam failure recovery request (BFRQ)) to the serving TRP/gNB to enable beam-formed 5G NR links to quickly and effectively re-form the beam-formed communication link, without having to go through the time consuming normal initial access procedure (i.e. reception of beam-formed SS Block (Sync/PBCH), followed by transmission of beam-formed RACH).

Up till now in 5G NR standardization at 3GPP transmission of a beam-failure recovery request (BFRQ) from the UE to the serving TRP or gNB has concentrated on two different mechanisms for 5G NR. The first mechanism uses the Physical Uplink Control CHannel (PUCCH) which is suitable for cases when the PUCCH control channel is available. An example of such a case is shown on the left hand side of FIG. 1 between a base station 101 and a UE 103. The second mechanism uses a non-contention Random Access Control Channel (RACH). This scheme provides the UE a faster initial access procedure and is especially useful when no PUCCH is available.

For all of the beam failure recovery schemes discussed and standardized at 3GPP for 5G NR so far, only schemes between serving gNBs (or TRPs) and UEs or multiple gNBs (see "Multi-cell beam recovery", Vancouver, Canada, 3GPP TSG RAN WG1 Meeting AH 1801, 2018) have been discussed so far. Therefore, beam failure recovery mechanisms have only been proposed using the same entities (corresponding gNB and UE) where the beam failure occurred.

There are typically two types of connections for vehicle-to-everything (V2X) applications, involving different entities: firstly, a Uu connection between gNB/TRP (or a road side unit, (RSU) and the vehicle, e.g., a vehicle to network (V2N) or vehicle to infrastructure (V2I) type link; secondly, a sidelink connection between the RSU/vehicle/pedestrian and the vehicle, e.g., a vehicle to vehicle (V2V) vehicle to infrastructure (V2I), or a vehicle to pedestrian (V2P) type link. On a road each vehicle may have a combination of these connections at the same time.

Due to the fragility (especially at HF) of 5G NR V2X sidelink and Uu links, a fast beam failure recovery mechanism to cope with the very dynamic channel characteristics is needed and in particular a fast beam recovery solution which can use an alternative connection from all of the available connections types, to recover the failed connection is needed for 5G NR V2X. Examples are beam recovery of sidelink using an alternative sidelink or the Uu link and beam recovery of Uu link using the sidelink or an alternative Uu link.

As mentioned above, there are two different mechanisms for 5G NR beam-formed recovery. However, these two standard schemes have different potential issues: firstly, the Physical Uplink Control CHannel (PUCCH) mechanism requires an uplink beam pair to be available and this may not always be the case, since downlink and uplink beams may in many situations be the same. Therefore, in many cases the uplink beams will also fail when the downlink beams fail. Secondly, the non-contention Random Access CHannel (RACH) mechanism is very expensive in terms of resources, since a non-contention (reserved space) needs to be maintained in uplink resources for each scheduled UE and this resource may only be used when a beam fails. It is therefore not resource efficient.

In light of the above, there is a need for communication devices for communication in a wireless communication network using beamforming and in particular for Vex, allowing for a more efficient beam failure recovery in the wireless communication network.

SUMMARY

It is an object of the invention to provide communication devices for communication in a wireless communication network using beamforming, allowing for an improved beam failure recovery in the wireless communication network.

The foregoing and other objects are achieved by the subject matter of the independent claims. Further implementation forms are apparent from the dependent claims, the description and the figures.

Generally, embodiments of the invention relate to a novel signaling solution using a variation of the PUCCH-type recovery scheme which utilizes a control or data connection that a communication device (e.g. a user equipment or a vehicle) has with another communication device (e.g., another vehicle, RSU, gNB, or pedestrian etc.) which is also connected to a failed serving entity to assist the downlink beam formed-recovery with the link to the failed serving entity.

Thus, embodiments of the invention in particular provide the following advantages: an uplink control connection with the failed serving entity is not required in comparison to the normal PUCCH approach. Furthermore, a large amount of reserved resources is not needed, as would be required for the normal non-contention RACH approach.

More specifically, according to a first aspect, the invention relates to a first communication device configured to communicate with a second communication device and a third communication device, in a wireless communication network using beamforming, wherein the first communication device is configured to: determine a new beam from a plurality of available beams of the second communication device, in response to a beam failure event with the second communication device; provide, in particular transmit, a beam failure recovery request, BFRQ, to the third communication device, wherein the BFRQ comprises information about the new beam of the second communication device determined by the first communication device; and obtain, in particular receive, from the second communication device a BFRQ response.

BFRQ, BFRQ response, or all further BFRQ-related information can be provided or obtained over a dedicated message, as part of another message, or via a further appropriate communication.

The first communication device, the second communication device or the third communication device can be a static device such as a fixed wireless access solution in a home or a user equipment, in particular an user equipment implemented in a vehicle, a base station, an eNB, a gNB, a transmit and receive point, TRP, a road side unit, RSU, or a remote radio head, RRH. The communication channel(s) between the communication devices can be an uplink, downlink or sidelink channel, in particular a control channel, in particular a PUCCH, PDCCH, PSCCH or a data channel, in particular a PUSCH or a PDSCH or a PSSCH.

Thus, an improved first communication device for communication in a wireless communication network using beamforming is provided, allowing for establishing a new communication link with a second communication device and for forwarding the BRFQ message to the second communication device more efficiently.

In a further possible implementation form of the first aspect, the first communication device is configured to transmit the BFRQ message to the third communication device using a first beam.

In a further possible implementation form of the first aspect, the first communication device is configured to receive the BFRQ response from the second device using a second beam.

The second beam can be different to the first beam or it can also be the same as the first beam.

In a further possible implementation form of the first aspect, there is a fixed, configurable and or preconfigured spatial relationship between the second beam for receiving and the new beam for transmitting.

In a further possible implementation form of the first aspect, the first communication device is configured to receive from the third communication device a BFRQ acknowledgement message that the BFRQ message is forwarded by the third communication device to the second communication device.

In a further possible implementation form of the first aspect, the first communication device is configured to receive the BFRQ acknowledgement message from the third communication device using a third beam.

In a further possible implementation form of the first aspect, there is a fixed, configurable or preconfigured spatial relationship between the first beam and the third beam.

In case of a preconfigured spatial relationship, the configuration could be obtained by a look-up table or signaled by another entity.

In a further possible implementation form of the first aspect, the first communication device is configured to receive information about the spatial relationship between the first beam and the third beam from the second communication device or another network entity.

In a further possible implementation form of the first aspect, the first communication device is configured to receive information, in particular a candidate beam RS list, from a fourth communication device about a plurality of available beams of the second communication device for beam recovery reporting, and the first communication device is configured to determine selection of the new beam on the basis of the information and the signals received from the second communication device.

The fourth communication device could be anyone of the second communication device, the third communication device, or a further communication device.

In a further possible implementation form of the first aspect, there is a fixed or configurable time offset between the reception of the BFRQ acknowledgment message and the reception of the BFRQ response message.

In a further possible implementation form of the first aspect, the first communication device is configured to select the third communication device from a plurality of communication devices.

In a further possible implementation form of the first aspect, the first communication device is configured to select the third communication device from known communication devices or communication devices to which it is already connected to.

In a further possible implementation form of the first aspect, the first communication device is configured to select the third communication device on the basis of information received by the first communication device, in particular one or more of the following information: information about neighbouring communication devices, position information of at least one of the known or connected communication devices, an identifier of a serving base station serving at least one of the known or connected communication devices, information about one or more beams of at least one of the known or connected communication devices, an identifier of a group of at least one of the known or connected communication devices.

According to a second aspect, the invention relates to a third communication device configured to communicate with a first communication device and a second communication device in a wireless communication network using beamforming, wherein the third communication device is configured to: receive a beam failure recovery request, BFRQ, message from the first communication device; determine that the beam failure recovery request, BFRQ, message is intended for the second communication device; and forward the BFRQ message to the second communication device, wherein the BFRQ message contains information about a new beam of the second communication device determined by the first communication device.

Thus, an improved third communication device for communication in a wireless communication network using beamforming is provided, allowing for forwarding the BRFQ message to a second communication device more efficiently.

In a further possible implementation form of the second aspect, the third communication device is configured to receive the beam failure recovery request from the first device using a fourth beam.

In a further possible implementation form of the second aspect, the third communication device is further configured to transmit a BFRQ acknowledgement message to the first communication device using a fifth beam.

In a further possible implementation form of the second aspect, there is a fixed, configurable or pre-configurable spatial relationship between the fourth beam and the fifth beam.

In a further possible implementation form of the second aspect, there is a fixed, configurable or preconfigured time offset between the reception of the BRFQ message and the transmission of the BFRQ acknowledgment.

According to a third aspect the invention relates to a second communication device configured to communicate with a first communication device and a third communication device in a wireless communication network using beamforming, wherein the second communication device is configured to: receive a beam failure recovery request, BFRQ, message from the third communication device, wherein the BFRQ message contains information about a new beam of the second communication device determined by the first communication device; and transmit to the first communication device a BFRQ response message, wherein the BFRQ response message contains a confirmation of the new beam.

Thus, an improved second communication device for communication in a wireless communication network using beamforming is provided, allowing for establishing a new communication link with a first communication device more efficiently.

In a further possible implementation form of the third aspect, the second communication device is configured to transmit the BFRQ response message to the first communication device using the new beam, wherein the BFRQ response message is received by the first communication device using a second beam.

In a further possible implementation form of the third aspect, there is a fixed, configurable or preconfigured spatial relationship between the second beam and the new beam.

In a further possible implementation form of the third aspect, there is a fixed, configurable or preconfigured time offset between the reception of the BRFQ message and the transmission of the BFRQ response.

The invention can be implemented in hardware or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF ILLUSTRATIVE EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

As will be described in more detail in the following, embodiments of the invention focus on a novel beam failure recovery procedure and a related signaling scheme for communication devices or user equipments (UEs) by utilizing a control or data connection that the communication device has with another communication device, but not with the failed serving communication device. Examples of such scenarios are shown in FIGS. 2 and 3 below.

Figure 2:
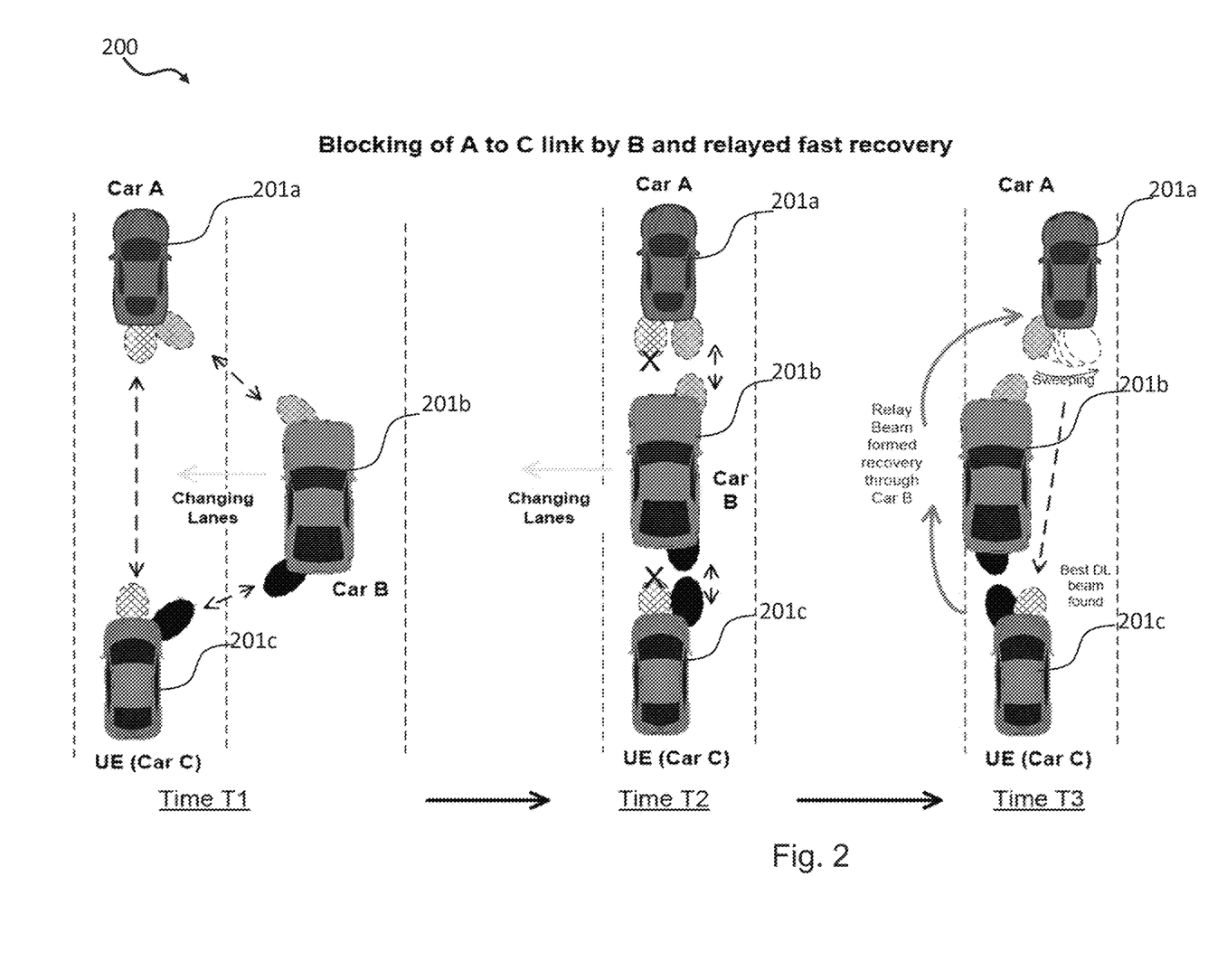
FIG. 2 shows a schematic diagram of an exemplary wireless communication network according to an embodiment.
Figure 3:
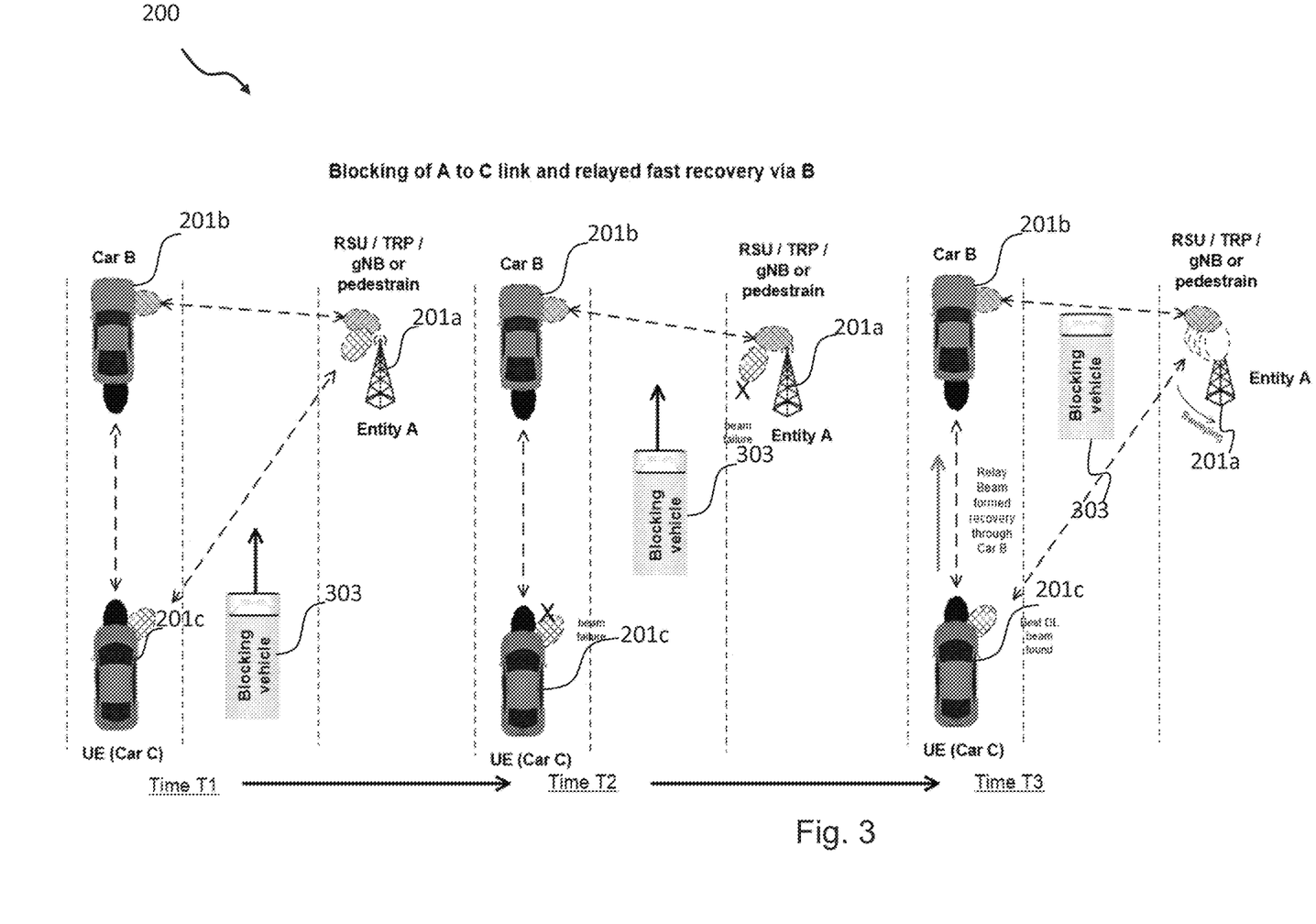
FIG. 3 shows a schematic diagram of an exemplary wireless communication network according to an embodiment.

FIG. 2 shows a schematic diagram of an exemplary wireless communication network 200 according to an embodiment, wherein the wireless communication network 200 comprises a first communication device 201c, a second communication device 201a, and a third communication device 201b for a scenario which has vehicle-to-vehicle (V2V) communications links. In the exemplary embodiment shown in FIG. 2, the communication devices 201a-c are implemented as vehicles or as a respective component thereof, such as an onboard unit. The person skilled in the art, however, will appreciate that embodiments of the invention can be applied to other types of communication devices as well.

In the exemplary embodiment shown in FIG. 2, at a time T1, the second communication device 201a, the third communication device 201b and the first communication device 201c are connected to each other.

At a later time T2, the communication link between the second communication device 201a and the first communication device 201c is blocked, because the third communication device 201b blocks the signal path.

At a further later time T3, the third communication device 201b moves further such that the first communication device 201c can receive reference or synchronization signals from the second communication device 201a again. However, since the second communication device 201a and the first communication device 201c are no longer connected in both directions (forward and reverse direction), the first communication device 201c does not have a control connection with the second communication device 201a and therefore the second communication device 201a cannot receive beam failure recovery requests (BFRQ) from the first communication device 201c using the conventional PUCCH procedure as described above.

Furthermore, as explained above, using the conventional non-contention RACH scheme would need an overhead which would be too high for this application. The embodiments of the invention provide a scheme whereby the beam failure recovery request (BFRQ) uses a control or data connection to another communication device (in this case the third communication device 201b) which then forwards the request to the second communication device 201a.

More specifically, embodiments of the invention provide the first communication device 201c to be configured to communicate with the second communication device 201a and the third communication device 201b in the wireless communication network 200 using beamforming. The first communication device 201c is configured to: determine a new beam from a plurality of available beams of the second communication device 201a, in response to a beam failure event with the second communication device 201a; and transmit a beam failure recovery request, BFRQ, message to the third communication device 201b using a first beam, wherein the BFRQ message contains information about the new beam of the second communication device 201a determined by the first communication device 201c.

The third communication device 201b is configured to: receive a beam failure recovery request, BFRQ, message from the first communication device 201c using a fourth beam; determine that the beam failure recovery request, BFRQ, message is intended for the second communication device 201a; and forward the BFRQ message to the second communication device 201a. There can be a fixed, configurable and or preconfigured spatial relationship between the second beam and the new beam.

The second communication device 201a is configured to receive a beam failure recovery request, BFRQ, message from the third communication device 201b and transmit to the first communication device 201c a BFRQ response message using the new beam, wherein the BFRQ response message contains a confirmation of the new beam. There can be a fixed, configurable or preconfigured time offset between the reception of the BRFQ message and the transmission of the BFRQ response. Later, the first communication device 201c then receives a BFRQ response message from the second communication device 201a using a second beam.

In an embodiment, the third communication device 201b is further configured to transmit a BFRQ acknowledgement message to the first communication device 201c using a fifth beam. In an embodiment, there is a fixed, configurable or preconfigured time offset between the reception of the BRFQ message at the third communication device and the transmission of the BFRQ acknowledgment from the third communication device or a fixed, configurable or preconfigured spatial relationship between the fourth beam and the fifth beam as well as between the first beam and the third beam.

Then, the first communication device 201c is configured to receive from the third communication device 201b using a third beam a BFRQ acknowledgement message that the BFRQ message is or has been forwarded by the third communication device 201b to the second communication device 201a. In an embodiment, there is a fixed or configurable time offset between the reception of the BFRQ acknowledgment message and the reception of the BFRQ response message.

It is worth noting that the first communication device 201c can select the third communication device 201b from a plurality of communication devices, for example, known communication devices or communication devices to which it is already connected to, wherein the third communication device 201b can selected on the basis of information received by the first communication device 201c, in particular one or more of the following information: information about neighbouring communication devices, position information of at least one of the known or connected communication devices, an identifier of a serving base station serving at least one of the known or connected communication devices, information about one or more beams of at least one of the known or connected communication devices, an identifier of a group of at least one of the known or connected communication devices.

In an embodiment, the first communication device 201c is configured to receive information about the spatial relationship between the first beam and the third beam from the second communication device 201a or another network entity. In an embodiment, the first communication device 201c is configured to receive configuration information, in particular a candidate beam RS list, from a fourth communication device including information about a plurality of available beams of the second communication device 201a for beam recovery reporting. The first communication device 201c can be configured to determine selection of the new beam on the basis of this information and the signals received from the second communication device 201c.

FIG. 3 shows a schematic diagram of a further embodiment of the wireless communication network 200, where the first communication device 201c and the third communication device 201b are vehicular user equipments and the second communication device is a serving base station 201a, such as a gNB, TRP or RSU. In the exemplary embodiment shown in FIG. 3, the connection between the serving base station 201a and the first communication device 201c is blocked by another vehicle 303. In this case, according to embodiments of the invention the first communication device 201c uses its existing connection with the third communication device 201b to relay the beam failure recovery request (BFRQ).

To enable this scheme, the embodiments of the invention can provide five key changes to the conventional schemes. These features and the corresponding signaling examples will be shown further below under reference to FIGS. 4, 5 and 6.

First, as already mentioned above, embodiments of the invention can include a "candidate beam RS-List" for each communication device, which is configured by the serving gNB 201a and sent to each communication device and contains a complete set of sidelink and Uu (Sync block and CSI-RS) resources transmitted by other neigbouring communication devices to the communication device. This is very different to the state-of-the-art schemes because since conventionally this list only contains downlink SSB and CSI-RS resources from the serving gNB.

The first communication device 201c can choose from this list, to select new beams.

Secondly, when the first communication device 201c (as shown, for instance, in FIG. 2) detects a beam failure in both the forward (downlink) and reverse (uplink) directions with the present connected entity (e.g., the second communication device 201a as shown in FIG. 2), the first communication device 201c first determines which new received beam from the second communication device 201a is the new best received beam from the set of beams in the "candidate beam RS-list" and then transmits the beam failure recovery request (BFRQ) to at least one other connected entity (e.g., the third communication device 201b), from a set of candidate entities to relay the request to the second communication device 201a. This enables the system not to use the resource intensive non-contention RACH scheme.

Thirdly, as already described above, the choice of the third communication device 201b from the set of candidates for transmitting the BFRQ request may be based on additional signals or information: a list of connected neighboring devices to the candidate entity; position information of candidate entities; ID or indicator indicating which base station, gNB or TRP is serving the candidate entity; and assigned beam resources or group ID of the candidate entity or alternatively it may just multicast the request to all other connected entities or communication devices.

Fourthly, as already described above, if the chosen entity (i.e., the third communication device 201b) can or cannot forward the BFRQ request to the second communication device 201a, it transmits an acknowledgment or non-acknowledgment to the first communication device 201c. This could be in the form of a "BFRQ relay ACK/NACK" signal.

In a further embodiment, as already described above, there can be a fixed or configurable time offset between transmission of this acknowledgement signal (BFRQ relay ACK/NACK) by the third communication device 201b and its previous reception of the BFRQ request from the first communication device 201c, so the first communication device 201c knows when to receive the BFRQ relay ACK/NACK message (this is shown as "time A" in FIGS. 4, 5 and 6 below).

Additionally, as already described above, there can be a "spatial correspondence", which is sometimes referred to as QCL (quasi-co-located) between the beams which are used for transmission and reception. This may mean a same or fixed beam offset, between the reception of the BFRQ request and the transmission of the BFRQ relay ACK/NACK signal, so the first communication device 201c knows which beam direction to receive the BFRQ relay ACK/NACK signal. This is shown with the label "same beam" in FIGS. 4, 5 and 6 below.

Finally, when the second communication device 201a can respond to the BFRQ request, it will send a BFRQ response message to the first communication device 201c. According to an embodiment, there can be a fixed, preconfigured or configurable time offset between the BFRQ response and the BFRQ relay ACK/NACK signal. This is to ensure that the first communication device 201c knows when to receive the BFRQ response. This is shown as "time B" in FIGS. 4, 5 and 6 below.

Additionally, the beam direction(s) which is used by the first communication device 201c for the reception of the BFRQ response can have a spatial correspondence, sometimes called QCL (quasi co-located), with the identified new beams used for transmission from the second communication device 201a. This is shown as "spatially QCL'ed with indicated beam resources" in FIGS. 4, 5 and 6 below.

Figure 4:
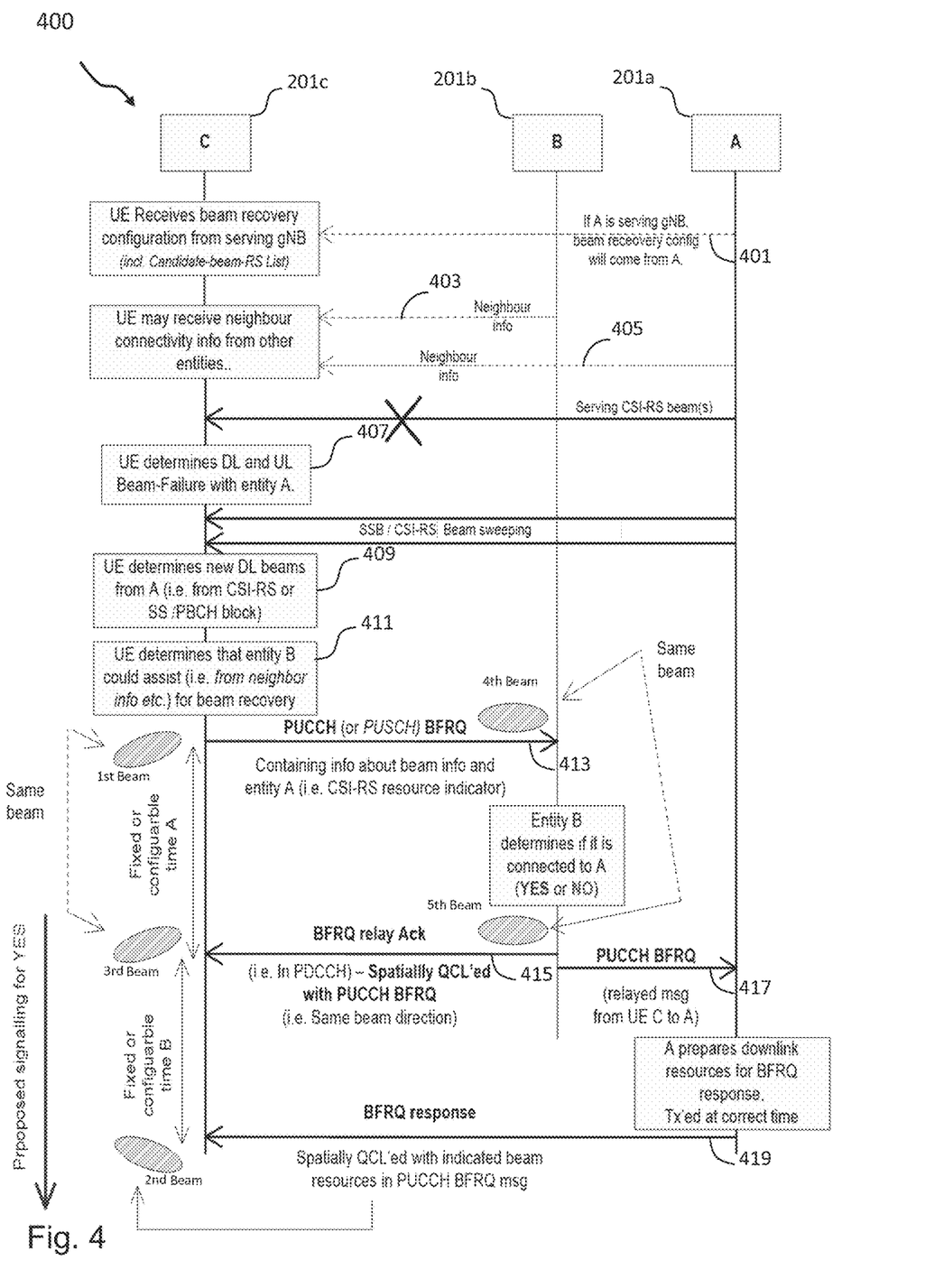
FIG. 4 shows a schematic diagram summarizing a signaling procedure according to an embodiment.

FIG. 4 shows a schematic diagram summarizing a signaling procedure 400 according to an embodiment, wherein the third communication device 201b acknowledges that it can forward the BFRQ request from the first communication device 201c to the second communication device 201a. The procedure 400 shown in FIG. 4 comprises the following steps:

Step 401: if the second communication device 201a is a serving gNB, the second communication device 201a sends a beam recovery configuration message to the first communication device 201c. This message may contain the candidate beam-RS-List.

Step 403: the third communication device 201b sends a neighbour connectivity information to the first communication device 201c.

Step 405: the second communication device 201a sends a neighbour connectivity information to the first communication device 201c.

Step 407: the first communication device 201c determines downlink (DL), uplink (UL) or sidelink (SL) beam failures with the second communication device 201a.

Step 409: the first communication device 201c determines newbeams from the second communication device 201a.

Step 411: the first communication device 201c determines that the third communication device 201b could assist for the beam recovery on the basis of some information (i.e. neighbour connectivity information).

Step 413: the first communication device 201c sends a beam failure recovery request (BFRQ) message to the third communication device 201b via a control channel (i.e. PUCCH) or a data (i.e. PUSCH) channel.

Step 415: the third communication device 201b transmits a BFRQ acknowledgement message to the first communication device 201c.

Step 417: the third communication device 201b forwards a BFRQ message to the second communication device 201a.

Step 419: the second communication device 201a transmits a BFRQ response message to the first communication device 201c.

Figure 5:
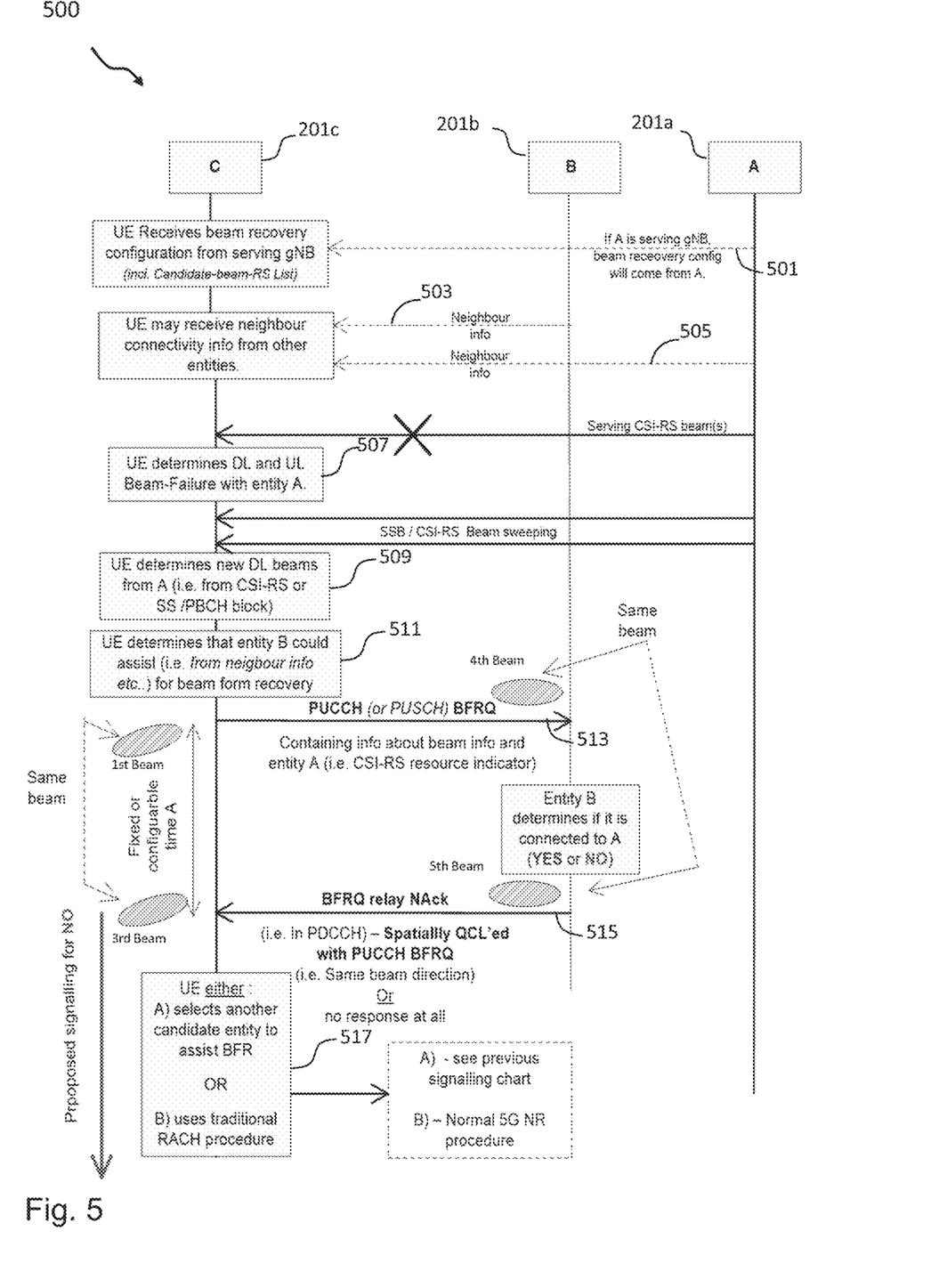
FIG. 5 shows a schematic diagram summarizing a signaling procedure according to an embodiment.

FIG. 5 shows a schematic diagram summarizing a further signaling procedure 500 according to an embodiment, wherein the further signaling procedure is similar to that shown in FIG. 4, but for the case that the third communication device 201b confirms via a negative acknowledgement (NACK) message that it cannot forward the BFRQ request to the second communication device 201a. This may happen due to a variety of reasons, including lack of available resources, or the fact that the third communication device 201b is not presently connected to the second communication device 201a. The procedure 500 shown in FIG. 5 comprises the following steps:

Step 501: if the second communication device 201a is a serving gNB, the second communication device 201a sends a beam recovery configuration message to the first communication device 201c. This message may contain the candidate beam-RS-List.

Step 503: the third communication device 201b sends a neighbour connectivity information to the first communication device 201c.

Step 505: the second communication device 201a sends a neighbour connectivity information to the first communication device 201c.

Step 507: the first communication device 201c determines downlink (DL), uplink (UL) or sidelink (SL) beam failures with the second communication device 201a.

Step 509: the first communication device 201c determines new beams from the second communication device 201a.

Step 511: the first communication device 201c determines that the third communication device 201b could assist for the beam recovery.

Step 513: the first communication device 201c sends a beam failure recovery request (BFRQ) message to the third communication device 201b via a control channel (i.e. PUCCH) or a data channel (i.e. PUSCH).

Step 515: the third communication device 201b transmits a negative acknowledgement (NACK) message to the first communication device 201c informing that it cannot forward the BFRQ request to the second communication device 201a.

Step 517: the first communication device 201c selects another communication device or entity to assist it beam recovery or selects another method, e.g. using a non-contention RACH scheme.

As shown in FIG. 5, if the third communication device 201b does not respond at all to the second communication device 201a in a specified period of time (Time A), the first communication device 201c may interrupt this in the same way as receiving a negative acknowledgement (NACK) message. In this example, once the first communication device 201c knows that the third communication device 201b cannot forward the BFRQ request, it may choose to select another communication device or entity to assist its beam recovery or may (if it is configured to do so) select another method, e.g. using a non-contention RACH scheme.

Figure 6:
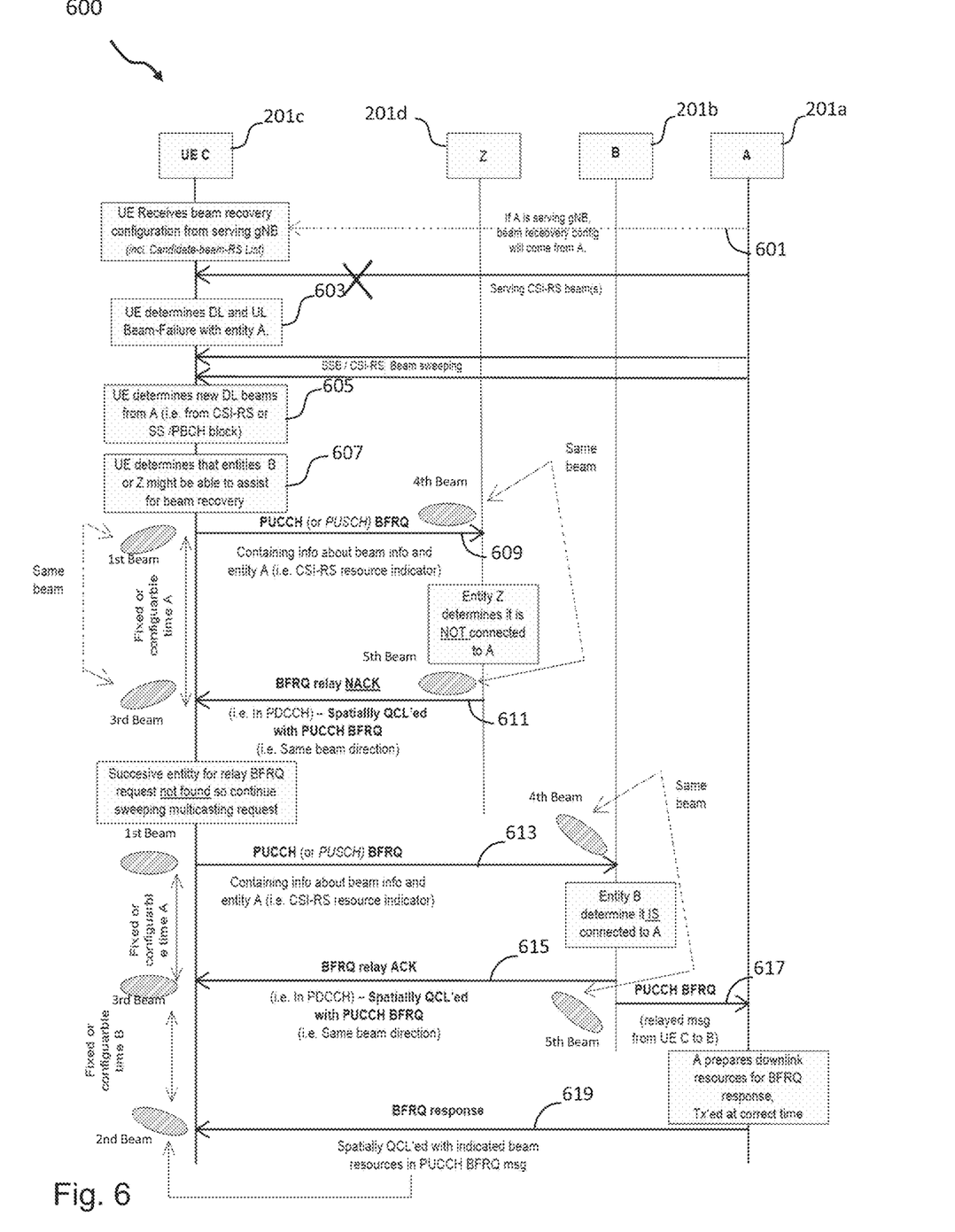
FIG. 6 shows a schematic diagram summarizing a signaling procedure according to an embodiment.

FIG. 6 shows a schematic diagram summarizing a further signaling procedure 600 according to an embodiment, wherein the first communication device 201c may successively request further connected communication devices or entities, such as the further communication device 201d illustrated in FIG. 6, to assist in relaying its beam recovery request (BFRQ) to the second communication device 201a, in a beam sweeping multicast manner. In the embodiment shown in FIG. 6, the communication device 201d, which has been requested, confirms via a NACK message that it is not possible to forward the BFRQ request to the second communication device 201a. Subsequently, the first communication device 201c then requests another entity, namely the third communication device 201b, for relay assistance and the third communication device 201b confirms it can relay the request to the second communication device 201a. The procedure 600 shown in FIG. 6 comprises the following steps:

Step 601: if the second communication device 201a is a serving gNB, the second communication device 20a sends a beam recovery configuration message to the first communication device 201c. This message may contain the candidate beam-RS-List.

Step 603: the first communication device 201c determines downlink (DL), uplink (UL) or sidelink (SL) beam failures with the second communication device 201a.

Step 605: the first communication device 201c determines new beams from the second communication device 201a.

Step 607: the first communication device 201c determines that the third communication device 201b or the further communication device 201d could assist for the beam recovery.

Step 609: the first communication device 201c sends a beam failure recovery request (BFRQ) message to the further communication device 201d via a control channel (i.e. PUCCH) or a data (PUSCH) channel.

Step 611: the further communication device 201d transmits a negative acknowledgement (NACK) message to the first communication device 201c informing that it cannot forward the BFRQ request to the second communication device 201a.

Step 613: the first communication device 201c sends a beam failure recovery request (BFRQ) message to the third communication device 201b via a control channel (i.e. PUCCH) or a data (i.e. PUSCH) channel.

Step 615: the third communication device 201b transmits a BFRQ acknowledgement message to the first communication device 201c.

Step 617: the third communication device 201b forwards a BFRQ message to the second communication device 201a.

Step 619: the second communication device 201a transmits a BFRQ response message to the first communication device 201c.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A first communication device configured to communicate with a second communication device and a third communication device in a wireless communication network using beamforming, the first communication device comprising:
   at least one processor; and
   a non-transitory memory storing instructions, which when executed by the at least one processor, cause the at least one processor to:

determine a new beam from a plurality of available beams of the second communication device, in response to a beam failure event with the second communication device;

provide a beam failure recovery request (BFRQ) to the third communication device, wherein the BFRQ comprises information about the new beam determined by the first communication device, and wherein the BFRQ is intended for the second communication device; and obtain, from the second communication device, a BFRQ response, in response to the BFRQ provided to the third communication device, wherein the second communication device is a serving base station, and each of the first communication device and the third communication device is a user equipment (UE).

2. The first communication device according to claim 1, wherein the instructions further cause the at least one processor to transmit the BFRQ to the third communication device using a first beam.

3. The first communication device according to claim 1, wherein the instructions further cause the at least one processor to receive the BFRQ response from the second communication device using a second beam.

4. The first communication device according to claim 3, wherein there is a fixed, configurable or preconfigured spatial relationship between the second beam and the new beam.

5. The first communication device according to claim 1, wherein the instructions further cause the at least one processor to obtain, from the third communication device, a BFRQ acknowledgement that the BFRQ is forwarded by the third communication device to the second communication device.

6. The first communication device according to claim 5, wherein the instructions further cause the at least one processor to receive the BFRQ acknowledgement from the third communication device using a third beam.

7. The first communication device according to claim 6, wherein there is a fixed, configurable or preconfigured spatial relationship between the first beam and the third beam.

8. The first communication device according to claim 7, wherein the instructions further cause the at least one processor to obtain information about the spatial relationship between the first beam and the third beam from the second communication device or another network entity.

9. The first communication device according to claim 1, wherein the instructions further cause the at least one processor to obtain information, from a fourth communication device, about a plurality of available beams of the second communication device, and to determine selection of the new beam on the basis of the information and a signal obtained from the second communication device.

10. The first communication device according to claim 5, wherein there is a fixed or configurable time offset between the obtaining of the BFRQ acknowledgment and the obtaining of the BFRQ response.

11. The first communication device according to claim 1, wherein the instructions further cause the at least one processor to select the third communication device from a plurality of communication devices.

12. The first communication device according to claim 11, wherein the instructions further cause the at least one processor to select the third communication device from known communication devices or communication devices to which it is already connected to.

13. The first communication device according to claim 11, wherein the instructions further cause the at least one processor to select the third communication device on the basis of at least one of following information received by the first communication device:

information about neighbouring communication devices, position information of at least one of the known or connected communication devices, an identifier of a serving base station serving at least one of the known or connected communication devices, information about one or more beams of at least one of the known or connected communication devices, or an identifier of a group of at least one of the known or connected communication devices.

14. The first communication device according to claim 1, wherein the first communication device is configured to determine the new beam from a candidate beam RS-list, wherein the candidate beam RS-list comprises a complete set of sidelink and sync block and channel state information reference signal (CSI-RS) resources received by the first communication device from neighboring communication devices.

15. The first communication device according to claim 1, wherein each of the first communication device and the third communication device is a vehicular user equipment.

16. A third communication device configured to communicate with a first communication device and a second communication device in a wireless communication network using beamforming, the third communication device comprising:

at least one processor; and a non-transitory memory storing instructions, which when executed by the at least one processor, cause the at least one processor to:

obtain a beam failure recovery request (BFRQ) from the first communication device;

determine that the BFRQ is intended for the second communication device; and forward the BFRQ to the second communication device, wherein the BFRQ contains information about a new beam of the second communication device determined by the first communication device, and wherein the BFRQ indicates to the second communication device to provide a BFRQ response to the first communication device, wherein the second communication device is a serving base station, and each of the first communication device and the third communication device is a user equipment (UE).

17. The third communication device according to claim 16, wherein the instructions further cause the at least one processor to obtain the BFRQ from the first communication device using a fourth beam.

18. The third communication device according to claim 17, wherein the instructions further cause the at least one processor to provide a BFRQ acknowledgement to the first communication device using a fifth beam.

19. The third communication device according to claim 18, wherein there is a fixed, configurable or pre-configurable spatial relationship between the fourth beam and the fifth beam.

20. The third communication device according to claim 18, wherein there is a fixed, configurable or preconfigured time offset between the obtaining of the BRFQ and the provision of the BFRQ acknowledgment.

\* \* \* \* \*